United States Patent
Iwase (10) Patent No.: US 8,855,165 B2
(45) Date of Patent: Oct. 7, 2014

(54) LASER APPARATUS

(71) Applicant: Canon Kabushiki Kaisha, Tokyo (JP)

(72) Inventor: Hideo Iwase, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/874,695

(22) Filed: May 1, 2013

(65) Prior Publication Data

US 2013/0315275 A1    Nov. 28, 2013

(30) Foreign Application Priority Data

May 23, 2012   (JP) .................................. 2012-117745

(51) Int. Cl.
*H01S 3/08*      (2006.01)
*H01S 3/106*     (2006.01)
*H01S 3/105*     (2006.01)
*H01S 3/16*      (2006.01)
*H01S 3/081*     (2006.01)

(52) U.S. Cl.
CPC ............... *H01S 3/08* (2013.01); *H01S 3/08054* (2013.01); *H01S 3/105* (2013.01); *H01S 3/1636* (2013.01); *H01S 3/08004* (2013.01); *H01S 3/106* (2013.01); *H01S 3/0812* (2013.01); *H01S 3/1623* (2013.01)
USPC ......................................................... 372/100

(58) Field of Classification Search
CPC ........ H01S 3/08; H01S 3/08004; H01S 3/106
USPC ............................................. 372/70, 102, 107
See application file for complete search history.

(56) References Cited

FOREIGN PATENT DOCUMENTS

JP           2005-123330      *  5/2005  .............. H01S 3/106

OTHER PUBLICATIONS

F.C. Strome, Jr., et al. "Flashtube-Pumped Dye Laser with Multiple-Prism Tuning", *Applied Optics*, vol. 10, No. 6, pp. 1348-1353 (1971).

* cited by examiner

*Primary Examiner* — Tuan Nguyen
(74) *Attorney, Agent, or Firm* — Fitzpatrick, Cella, Harper & Scinto (57) ABSTRACT

The present invention employs a laser apparatus including: a cavity provided with reflecting means and output means; a gain member placed on an optical path between the reflecting means and the output means; a wavelength dispersion mechanism that disperses a light beam passing through the optical path; and a wavelength selecting mechanism including a wedge prism which is movable relative to the optical path and changes a traveling direction of a light beam, the wavelength selecting mechanism being configured to change a wavelength of a light beam to be outputted from the output means by being given a gain by the gain member in accordance with a position of the wedge prism, the wavelength dispersion mechanism including a prism which is positioned on the optical path to allow a light beam traveling on the optical path to become incident on the prism at Brewster's angle.

9 Claims, 7 Drawing Sheets

LASER APPARATUS

BACKGROUND OF THE INVENTION

1. Field of the Invention

The present invention relates to a laser apparatus.

2. Description of the Related Art

In recent years, intensive study has been made in the medical field on an optical imaging technique for irradiating a living body with light outputted from a light source, such as a laser, and imaging signals generated by interaction between the incident light and a tissue of the living body. The photoacoustic tomography (PAT) is one of such optical imaging techniques. The PAT includes irradiating a living body with pulsed light outputted from a light source and then detecting an acoustic wave generated from a tissue of the living body that has absorbed the pulsed light. The acoustic wave generated by such a photoacoustic effect is also called a "photoacoustic wave".

A segment to be examined, such as a tumor, often exhibits a high absorptivity and swells instantaneously upon irradiation by absorbing a larger amount of optical energy than peripheral tissues. By detecting a photoacoustic wave generated upon the swelling by using an acoustic wave detector and then analyzing the signal of the photoacoustic wave, a sound pressure distribution of the photoacoustic wave generated by the photoacoustic effect in the tissue of the living body can be imaged. Hereinafter, the image thus obtained will be referred to as a "photoacoustic image".

The photoacoustic image can be converted to an optical characteristic distribution in a living body, particularly to an absorption coefficient distribution. Such information can be utilized in quantitatively measuring a substance in a subject to be examined, for example, glucose or hemoglobin contained in blood. In recent years, intensive research on a photoacoustic imaging apparatus has been proceeding for the purpose of applying a blood vessel image obtained by the PAT to imaging and diagnosis of a breast cancer or the like.

A substance in a living body, such as glucose or hemoglobin, differs in absorptivity depending on the wavelength of incident light. Therefore, the distribution of the substance in the living body can be measured more precisely by irradiating the living body with different wavelengths of light and analyzing the difference between resulting absorption coefficient distributions. Usually, light having a wavelength ranging from 500 nm to 1,200 nm is used as irradiation light. Particularly when absorption of melanin or water has to be avoided, near-infrared light ranging from 700 nm to 900 nm is used as irradiation light.

As a light source capable of outputting a plurality of wavelengths of light within the wavelength range noted above, a tunable laser apparatus is known which uses a titanium sapphire crystal or an alexandrite crystal as a gain material. Such a tunable laser apparatus has an optical resonator (cavity) in which the titanium sapphire crystal or the alexandrite crystal is placed and is capable of outputting different wavelengths of light by switching an oscillation wavelength of the cavity to another.

Figure 7:
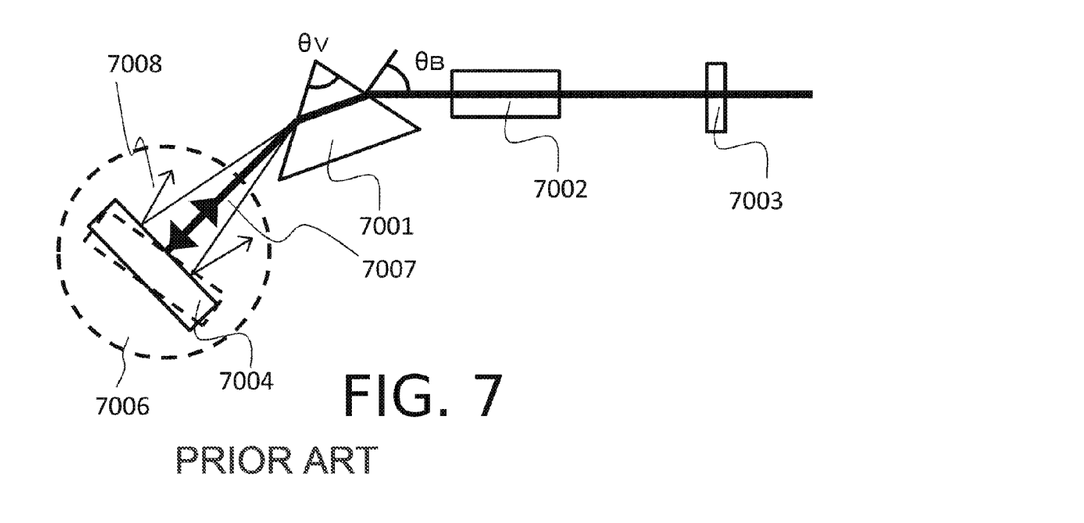
FIG. 7 is a schematic view illustrating a tunable laser apparatus provided with a conventional wavelength switching mechanism.

In "Flashtube-pumped Dye laser with Multiple-Prism Tuning," Applied Optics/Vol. 10, No. 6, P. 1348/June (1971), (NPL 1: Non Patent Literature 1), there is described a laser apparatus configured to output different wavelengths of light by changing the angle formed between a prism and a mirror which form a cavity. FIG. 7 is a schematic view illustrating a wavelength switching mechanism of the tunable laser apparatus described in "Flashtube-pumped Dye laser with Multiple-Prism Tuning," Applied Optics/Vol. 10, No. 6, P. 1348/June (1971).

In FIG. 7, light having passed through a prism 7001 is refracted at an angle in accordance with the wavelength thereof. That is, different wavelengths of light having passed through the prism 7001 are refracted at different angles by wavelength dispersion ($d\theta/d\lambda$) of the refraction angle of the prism.

Only that light beam 7007 of light beams refracted at different angles which is perpendicularly incident on a mirror 7004 is reflected by the mirror 7004 and returned into the cavity. The light beam 7007 thus returned into the cavity reciprocates within the cavity and is given a gain by a gain member 7002 to generate oscillation.

In FIG. 7, the mirror 7004 is mounted on a mirror rotating mechanism 7006. The mirror rotating mechanism 7006 rotates the mirror 7004 while positioning the mirror 7004 perpendicularly to a plane including incident and reflected light having been subjected to wavelength dispersion (i.e., a plane parallel to the drawing sheet of FIG. 7). With the mirror 7004 thus rotating, light beams of different wavelengths become perpendicularly incident on the mirror 7004 in accordance with the angle of rotation of the mirror 7004 and are returned into the cavity. In this way, different wavelengths of light can be oscillated by changing the angle of rotation of the mirror 7004.

A technique described in Japanese Patent Application Laid-open No. 2005-123330 (PTL 1: Patent Literature 1) is also known.

Non Patent Literature 1: "Flashtube-pumped Dye laser with Multiple-Prism Tuning", Applied Optics/Vol. 10, No. 6, P. 1348/June (1971)

Patent Literature 1: Japanese Patent Application Laid-open No. 2005-123330

SUMMARY OF THE INVENTION

The wavelength switching mechanism described in "Flashtube-pumped Dye laser with Multiple-Prism Tuning," Applied Optics/Vol. 10, No. 6, P. 1348/June (1971), however, has a drawback that an error in the angle of the mirror occurs as the mirror is rotated repeatedly and, hence, the wavelength of light outputted from the laser apparatus is deviated from a desired one. Such a deviation of the wavelength of outputted laser light causes an error to occur in quantitatively measuring a substance in a living body, e.g., glucose, hemoglobin or the like.

Description will be made of this problem with reference to FIG. 7. In FIG. 7, the prism 7001 used is an isosceles prism having a vertex angle $\theta V$. In FIG. 7, $\theta B$ represents the Brewster's angle of the glass material used for the prism. In this example, $\theta V = 180° - 2 \times \theta B$. Light becomes incident on the prism 7001 at the Brewster's angle $\theta B$. Light having been incident on the prism and passed therethrough is partially returned into the cavity by the mirror 7004.

In the arrangement described above, the amount of change in refraction angle $\theta$ relative to wavelength $\lambda$ (wavelength dispersion of the refraction angle: $d\theta/d\lambda$) and the wavelength dispersion of refractive index ($dn/d\lambda$) have the relationship substantially represented by the following expression (1).

$$d\theta/d\lambda \sim 2 \times (dn/d\lambda) \tag{1}$$

In cases where the prism is made of synthetic quartz which is a typical glass material, the wavelength dispersion of the refraction angle within the range from 500 nm to 1,000 nm is about 0.002 (°/nm). When the wavelengths $\lambda 1$ and $\lambda 2$ of light used for measurement of a substance in a living body are 800 (nm) and 750 (nm), respectively, the rotation angle φ of the mirror needed for wavelength switching is (λ1−λ2)×dθ/dλ∼0.1°.

In quantitatively measuring a substance in a living body, the rotation angle of the mirror has to be controlled with higher precision than the rotation angle φ estimated above. In general, medical institutions, such as hospitals, need to use a photoacoustic measurement apparatus for a long time in a maintenance-free manner. In such a medical site, an error in the rotation angle of the mirror due to long-term use degrades the precision of measurement of a substance in a living body.

The present invention has been made with the foregoing circumstances in view. An object of the present invention is to provide a technique for use in a tunable laser apparatus which enables the wavelength switching to be performed stably while facilitating the maintenance of the laser apparatus.

The present invention provides a laser apparatus comprising:

a cavity provided with reflecting means and output means;

a gain member placed on an optical path between the reflecting means and the output means;

a wavelength dispersion mechanism configured to disperse a light beam passing through the optical path in accordance with a wavelength thereof; and a wavelength selecting mechanism including a wedge prism which is movable relative to the optical path and changes a traveling direction of a light beam, the wavelength selecting mechanism being configured to change a wavelength of a light beam to be outputted from the output means by being given a gain by the gain member in accordance with a position of the wedge prism, the wavelength dispersion mechanism including a prism which is positioned on the optical path to allow the light beam traveling on the optical path to become incident on the prism at a Brewster's angle.

According to the present invention, it is possible to provide a technique for use in a tunable laser apparatus which enables the wavelength switching to be performed stably while facilitating maintenance of the laser apparatus.

Further features of the present invention will become apparent from the following description of exemplary embodiments with reference to the attached drawings.

DESCRIPTION OF THE EMBODIMENTS

Hereinafter, preferred embodiments of the present invention will be described with reference to the drawings. It is to be noted that the sizes, materials, shapes and relative positions of components described below have to be changed appropriately depending on the configuration and various conditions of an apparatus to which the present invention is applied and are not intended to limit the scope of the present invention to the following description.

Embodiment 1

The following description is directed to a laser apparatus according to the present invention.

Figure 1A:
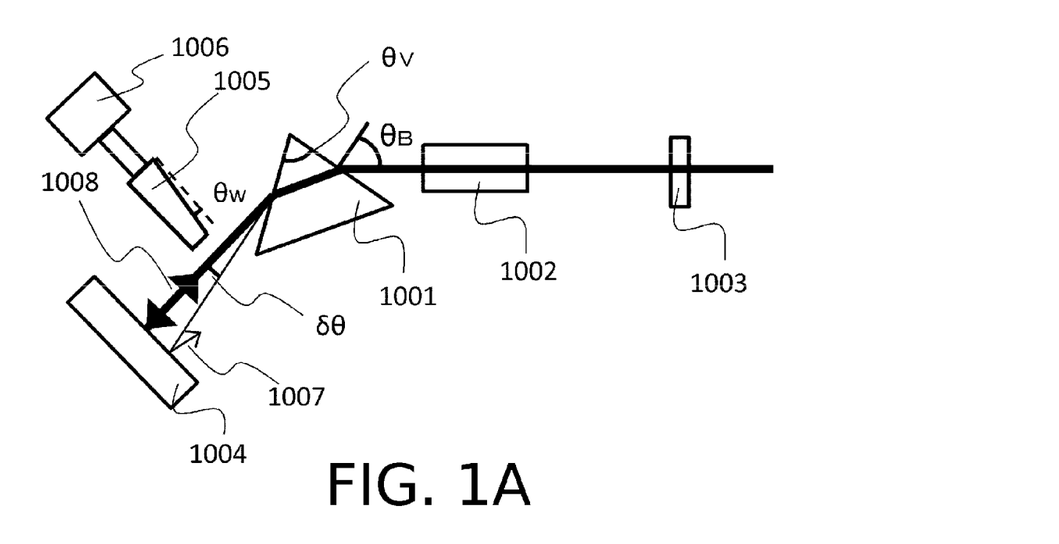
FIGS. 1A and 1B are schematic views illustrating a laser apparatus according to Embodiment 1.
Figure 1B:
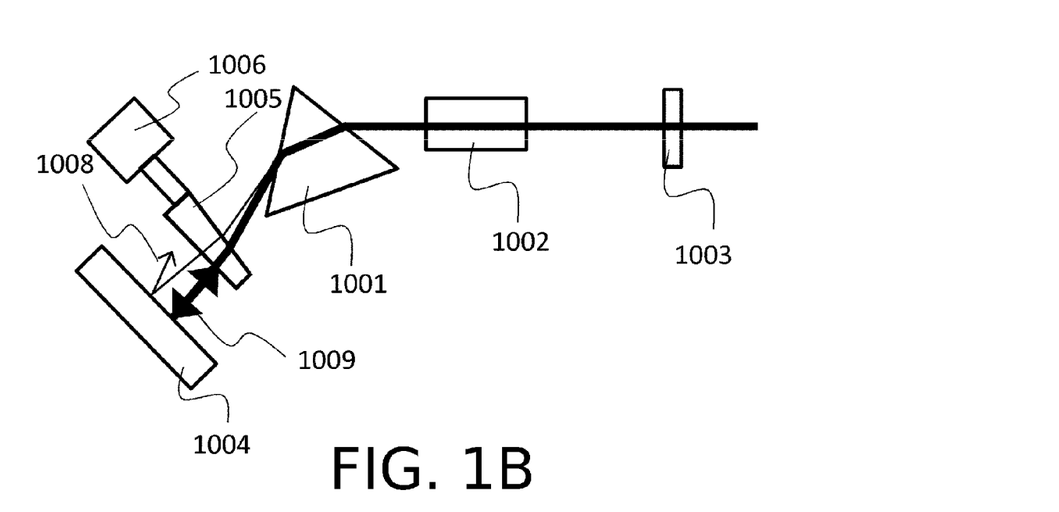

FIG. 1 is a schematic view illustrating a laser apparatus according to Embodiment 1 of the present invention. The laser apparatus includes a gain member 1002 which gives rise to stimulated emission, and a mirror 1004 and an output coupler 1003 which form a cavity. In the present invention, the mirror is equivalent to reflecting means and the output coupler is equivalent to output means. The laser apparatus also includes a wavelength dispersion mechanism 1001 which causes wavelength dispersion of the refraction angle where light beams of different wavelengths are refracted at different angles, and a wavelength selecting mechanism which selects an oscillation wavelength.

The laser apparatus for use in measuring a substance in a living body can select a titanium sapphire crystal or an alexandrite crystal for example as a material for the gain member 1002 serving as a gain medium. The output coupler 1003 has a lower reflectance than the mirror 1004. Light passing through the output coupler 1003 forms the output of the laser apparatus. In the present embodiment, the wavelength dispersion mechanism 1001 is formed of an isosceles prism. Assuming that one oscillation wavelength of the laser apparatus is λ1 and the Brewster's angle of the glass material forming the prism relative to λ1 is θB (°), the vertex angle θV of the isosceles prism is 180°−2×θB.

The wavelength selecting mechanism is formed of a wedge prism 1005 for changing the traveling direction of light, and an actuating mechanism 1006. The wedge prism 1005 can be moved by the actuating mechanism 1006. The actuating mechanism 1006 moves the wedge prism 1005 so as to insert the wedge prism 1005 into the optical path of the cavity or remove the wedge prism 1005 out of the optical path. The wedge prism 1005 has a wedge angle θw. A state of the laser apparatus in which the wedge prism 1005 is placed out of the optical path of the cavity and a state of the laser apparatus in which the wedge prism 1005 is inserted in the optical path of the cavity are illustrated in FIGS. 1A and 1B, respectively.

The following description is directed to operations of the laser apparatus in the states illustrated in FIGS. 1A and 1B.

(In the State in which the Wedge Prism is Placed out of the Optical Path of the Cavity)

FIG. 1A illustrates the laser apparatus in the state in which the wedge prism 1005 is placed out of the optical path of the cavity. Here, the wavelength dispersion mechanism 1001 is a prism. The prism 1001 is positioned in the cavity to allow light of the wavelength λ1 reflected by the mirror 1004 and the output coupler 1003 to become incident thereon at the incidence angle θB.

A light beam 1008 having the wavelength λ1 as a spectral center wavelength (hereinafter will be referred to as a "light beam of wavelength λ1") passes through the gain member 1002 and the prism 1001 and reaches the mirror 1004. The mirror 1004 returns the light beam 1008 of wavelength λ1 into the cavity. The light beam 1008 of wavelength λ1 thus returned into the cavity passes through the prism 1001 and the gain member 1002, reaches the output coupler 1003, and is then partially returned into the cavity by the output coupler 1003. In this way, the light beam 1008 of wavelength λ1 reciprocates within the cavity and is amplified by the gain member 1002 to generate oscillation.

A light beam 1007 having a wavelength different from the wavelength λ1 becomes incident on the mirror at an incidence angle different from that of the light beam 1008 and hence is reflected outwardly of the cavity before being given a gain sufficient to generate oscillation by the gain member 1002. Therefore, the light beam 1007 cannot reciprocate within the cavity to obtain a sufficient gain from the gain member and hence fails to generate oscillation.

(In the State in which the Wedge Prism is Placed on the Optical Path of the Cavity)

In FIG. 1B, the wedge prism 1005 is inserted in the optical path of the cavity by the actuating mechanism 1006. In this case, the light beam 1008 of wavelength λ1 changes its traveling direction by passing through the wedge prism and hence becomes incident on the mirror 1004 at an angle different from that shown in FIG. 1A.

The light beam 1008 of wavelength λ1 having been incident on the mirror at the angle different from that shown in FIG. 1A is reflected outwardly of the cavity before being given a gain sufficient to generate oscillation by the gain member 1002. Therefore, the light beam 1008 of wavelength λ1 cannot reciprocate within the cavity to obtain a sufficient gain from the gain member and hence fails to generate oscillation.

On the other hand, a light beam 1009 of wavelength λ2 is refracted by passing through the wedge prism 1005 and becomes perpendicularly incident on the mirror 1004. Therefore, the light beam 1009 of wavelength λ2 is reflected by the mirror 1004 and returned into the cavity. The light beam 1009 of wavelength λ2 thus returned into the cavity reciprocates within the cavity to obtain a sufficient gain from the gain member and hence generates oscillation.

As described above with reference to FIG. 1, the laser apparatus according to the present embodiment is capable of oscillating the light beams of different wavelengths λ1 and λ2 selectively by inserting or not inserting the wedge prism into the optical path.

Specific Example

The following description is made of the present embodiment by using specific numerical values.

In FIG. 1, it is possible to use synthetic quartz as the glass material for the prism 1001 and wedge prism 1005 and a plane mirror having no curvature as the mirror 1004. When the wavelengths λ1 and λ2 are 800 nm and 750 nm, respectively, the Brewster's angle θB and vertex angle of the prism are about 55° and about 70°, respectively. An example of the gain member 1002 which can give a gain within such a wavelength range is an alexandrite crystal. The difference δθ between the refraction angle of a light beam having a wavelength of 800 nm and that of a light beam having a wavelength of 750 nm which is made upon their passage through the prism 1001 is about 0.09° to about 0.10°. (Hereinafter, δθ will be referred to as an "angle of separation".)

The angle of the mirror 1004 is adjusted such that the light beam 1008 of 800 nm wavelength becomes perpendicularly incident on the mirror 1004 when the wedge prism is not inserted as shown in FIG. 1A. With the angle of the mirror 1004 thus adjusted, the light beam 1008 of 800 nm wavelength is reflected within the cavity and reciprocates between the mirror 1004 and the output coupler 1003 to obtain a gain from the gain member 1002 made of alexandrite crystal, thereby generating oscillation.

In FIG. 1B, on the other hand, the wedge prism 1005 having a wedge angle θW of ~0.18° is inserted in the cavity perpendicularly to the optical path. With the wedge prism 1005 thus inserted, the light beam 1009 of 750 nm wavelength becomes perpendicularly incident on the mirror. Therefore, the light beam 1009 of 750 nm wavelength reciprocates between the mirror 1004 and the output coupler 1003 to obtain a gain from the gain member 1002, thereby generating oscillation.

In the laser apparatus thus configured according to the present embodiment, the wedge angle θw of the wedge prism is selected such that the angle of separation δθ between the light beams of two wavelengths to generate oscillation, the wedge angle θw, and the refractive index n of the wedge prism satisfy the following expression (2).

$$\sin(\delta\theta+\theta w)=n\times\sin(\theta w) \quad (2)$$

In the present embodiment, the deviation of oscillation wavelength relative to the error in the inclination of the wedge prism 1005 is very small. In the conventional tunable laser apparatus shown in FIG. 7 for example, when an error of 0.01° is present in the inclination of the mirror, the resulting deviation of oscillation wavelength is about 5 nm. In the laser apparatus shown in FIG. 1 according to the present invention, on the other hand, when the error in the inclination of the inserted wedge prism is 0.01°, the resulting deviation of oscillation wavelength is not more than 0.3 nm.

The alexandrite crystal has a gain spectrum of about 100 nm width, the spectral center of which is 750 nm wavelength. The angle of separation δθ between 700 nm wavelength and 800 nm wavelength is about 0.2°. Therefore, the laser apparatus using such an alexandrite crystal can selectively oscillate two desired wavelengths within the range from 700 nm to 800 nm by setting the wedge angle θw of the wedge prism 1005 to satisfy 0°<θw=<0.36°.

When the prism 1001 is formed using a glass material which causes larger wavelength dispersion of the refraction angle to occur, e.g., glass material F2 produced by SCHOTT Inc., the resulting wavelength dispersion of the refraction angle is about twice as large as that of the synthetic quartz prism. In this case, two desired wavelengths within the range from 700 nm to 800 nm can be switchably oscillated by setting the wedge angle θw of the wedge prism to satisfy 0°<θw=<0.72°. Use of such a glass material causing large wavelength dispersion of the refraction angle makes the deviation of oscillation wavelength smaller.

In the present embodiment, the optical surface of the wedge prism 1005 may be coated with an antireflection film. In this case, the reflection loss at the surface of the wedge prism is reduced and, hence, the oscillation threshold is lowered, which will result in a higher output.

The mirror 1004 may be a concave or convex mirror having a curvature determined in view of the thermal lens effect. In this case, a light beam can be given an increased gain by changing the diameter of the light beam passing through the gain member. For this reason, the oscillation threshold can be lowered to generate a higher output.

Embodiment 2

Figure 2:
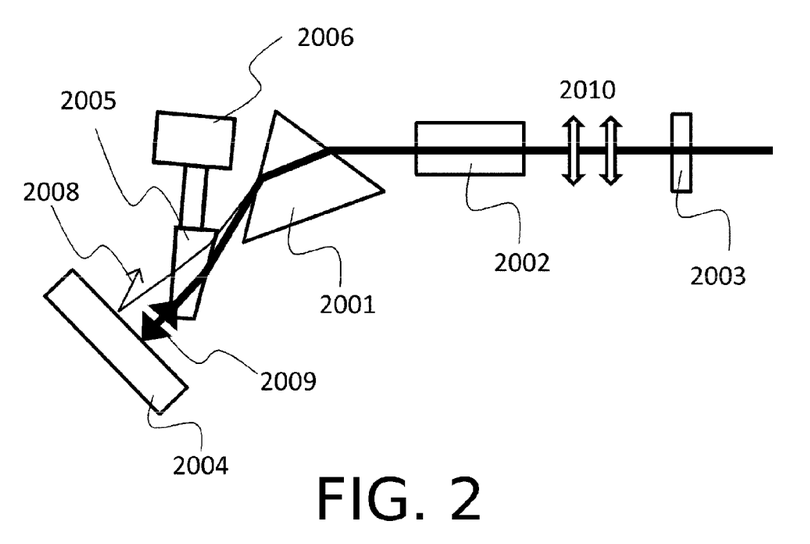
FIG. 2 is a schematic view illustrating a laser apparatus according to Embodiment 2.

FIG. 2 is a schematic view illustrating a laser apparatus according to Embodiment 2 of the present invention. In FIG. 2, a wedge prism 2005 is inserted so as to be positioned substantially parallel with one side of a prism 2001 forming the wavelength dispersion mechanism. For this reason, a light beam 2009 of an oscillation wavelength is incident on the wedge prism 2005 at substantially the Brewster's angle.

In FIG. 2, hollow arrows 2010 indicate the orientation of an electric field of p-polarized light becoming incident on the prism 2001 and wedge prism 2005. The p-polarized light which becomes incident on the prism 2001 and wedge prism 2005 at the Brewster's angle is subjected to substantially zero reflection at surfaces thereof. Therefore, the laser apparatus having the configuration shown in FIG. 2 can generate oscillation with a lowered threshold.

In the laser apparatus according to the present embodiment, the wedge angle θw of the wedge prism 2005 can be selected to satisfy the following expression (3):

$$\sin(\delta\theta+\theta w+\theta b)=n\times\sin(\arcsin(\sin(\theta b)/n)+\theta w) \quad (3),$$

where δθ represents the angle of separation between light beams of oscillation wavelengths λ1 and λ2, θb represents the Brewster's angle of the wedge prism 2005, and n represents the refractive index of the wedge prism 2005.

For example, in cases where the oscillation wavelength is switched between 800 nm wavelength and 750 nm wavelength by selecting synthetic quartz as the glass material for the prism and selecting a glass material having a refractive index of about 1.5 for the wedge prism, δθ is ~0.1° and θb is ~55°. In such a case, the wedge angle θw satisfying the expression (3) is about 0.075°.

A gain member 2002, an output coupler 2003, a mirror 2004 and an actuating mechanism 2006 can be similar in feature to the corresponding components of the foregoing embodiment. A light beam 2008 is a light beam which fails to generate oscillation when the wedge prism is inserted.

In the laser apparatus according to the present embodiment, the optical surface of the wedge prism need not necessarily be coated with an antireflection film, which is susceptible to damage by laser light. Therefore, the present embodiment is more suitable for enhancing the output of the laser apparatus.

Embodiment 3

Figure 3:
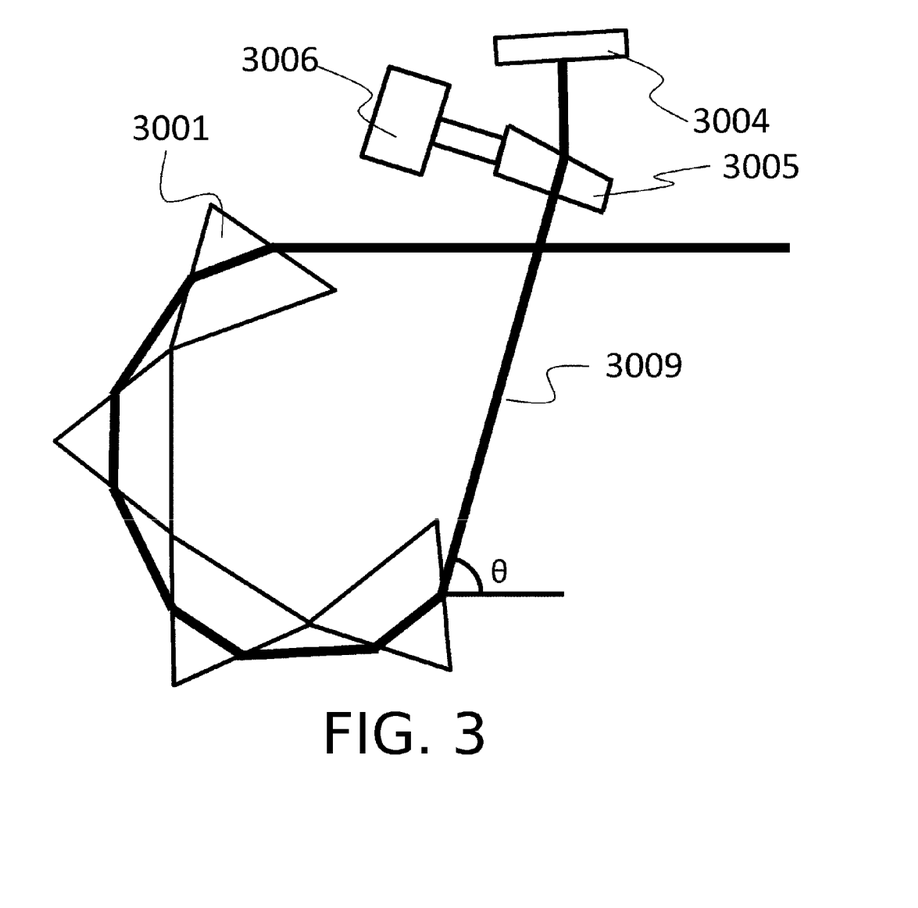
FIG. 3 is a schematic view illustrating a laser apparatus according to Embodiment 3.

In the laser apparatus according to the present invention, the wavelength dispersion mechanism may be formed of two or more prisms. FIG. 3 is a schematic view illustrating an embodiment in which the wavelength dispersion mechanism is formed of four prisms 3001.

The four prisms 3001 are positioned on the optical path at the Brewster's angle relative to each other. That is, a light beam 3009 is incident on the four prisms at substantially the Brewster's angle. Therefore, the reflection loss at the surfaces of the prisms can be reduced.

Since the light beam becomes incident on the prisms at the same angle, the resulting wavelength dispersion of the refraction angle (dθ/dλ) is about four times as large as that of the case where one prism is used. In order to obtain larger wavelength dispersion of the refraction angle, the prisms are manufactured using glass material F2 produced by SCHOTT Inc. for example. In this case, the resulting wavelength dispersion of the refraction angle is about twice as large as that of a synthetic quarts prism.

In this case, when two desired wavelengths of light within the range from 700 nm to 800 nm are to be oscillated selectively by using an alexandrite crystal as the gain member, the wedge angle θw of a wedge prism 3006 to be perpendicularly inserted into the optical path satisfies 0°<θw=<2.88°. When the wedge prism is inserted into the optical path to form the Brewster's angle therewith, n is ~1.67, δθ is ~1.6°, θb is ~59°, and the wedge angle satisfies 0°<θw=<1.20°. The laser apparatus thus configured according to the present embodiment exhibits a further reduction in oscillation wavelength deviation due to the inclination error of the wedge prism 3005.

A mirror 3004 and an actuating mechanism 3006 can be similar in feature to the corresponding components of the foregoing embodiments.

Embodiment 4

Figure 4A:
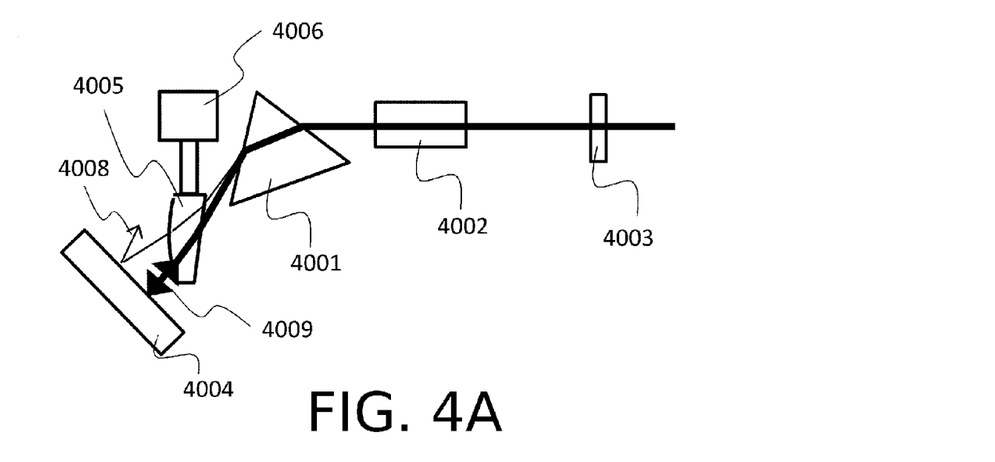
FIGS. 4A to 4C are schematic views illustrating a laser apparatus according to Embodiment 4.
Figure 4B:
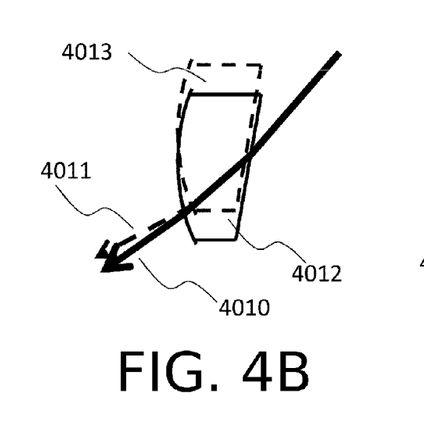
Figure 4C:
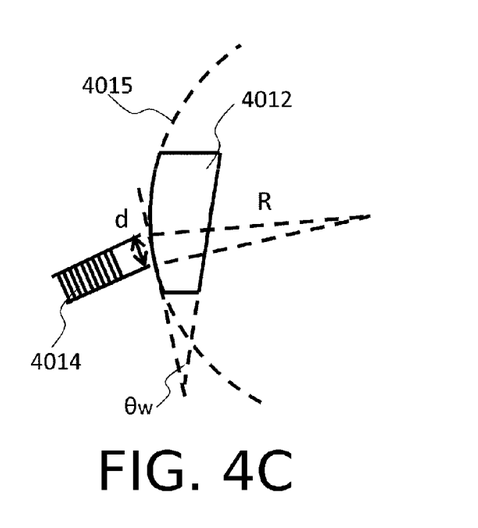

FIG. 4 is a schematic view illustrating a laser apparatus according to Embodiment 4 of the present invention. In FIG. 4, a wedge prism 4005 has one side which is curved and which forms a part of a cylinder. In FIG. 4, the central axis of the cylinder forming a surface of the wedge prism extends perpendicularly to the drawing sheet.

FIG. 4A illustrates a state in which the wedge prism 4005 is inserted in the optical path. With the wedge prism 4005 in this state, a light beam 4009 reciprocates within the cavity while passing through the curved surface of the wedge prism 4005, thereby generating oscillation.

Solid lines and broken lines of FIG. 4B depict wedge prisms 4012 and 4013 which are different in inserted position from each other and indicate optical paths 4010 and 4011 of light beams passing through the respective wedge prisms. Since one side of the wedge prism is curved, light incident on the wedge prism is refracted at different angles depending on the inserted position of the wedge prism. The configuration of the present embodiment is capable of fine adjustment to correct the wavelength deviation due to mounting errors of the prism, mirror, output coupler and the like by changing the inserted position of the wedge prism.

FIG. 4C illustrates the relationship among a radius R of cylinder 4015 forming a surface of the wedge prism 4012, a length d of an arc forming part of a cylinder surface through which a light beam 4014 passes, and a wedge angle θw. Since one side of the wedge prism is curved, the wedge angle θw varies by Δθw~180/π×d/R(°) and is distributed within the cross section through which the light beam passes. Such a wedge angle distribution Δθw imparts an oscillating light beam with a spectrum width Δλ.

Assuming that the wavelength dispersion of the refraction angle by the wavelength dispersion mechanism is dθ/dλ, the wedge angle distribution Δθw in a cross section of a light beam and the spectrum width Δλ have the relationship represented by the following expression (4).

$$\Delta\lambda=\Delta\theta w/(d\theta/d\lambda)\sim[180°/\pi\times d/R]/(d\theta/d\lambda) \quad (4)$$

In a laser apparatus for use in an acoustic measurement apparatus, the spectrum width Δλ is desirably not more than 5 nm. That is, it is desirable that Δθw/(dθ/dλ)<=5 nm be satisfied.

In FIG. 4, only one side of the wedge prism is curved. Even when the both sides of the wedge prism are curved, the effect of the present embodiment can be obtained similarly. In this case, Δθw in expression (4) represents a wedge angle distribution caused by the curved both sides of the wedge prism.

A prism 4001 as the wavelength dispersion mechanism, a gain member 4002, an output coupler 4003, a mirror 4004 and an actuating mechanism 4006 can be similar in feature to the corresponding components of the foregoing embodiments. A light beam 4008 is a light beam which fails to generate oscillation when the wedge prism is inserted.

Embodiment 5

FIG. 5 is a schematic view illustrating a laser apparatus according to Embodiment 5 of the present invention. In FIG. 5, the wedge prism to be inserted into the optical path is a wheel-type wedge prism 5005 shaped like a wheel. The wheel-type wedge prism is formed of a plurality of sector-shaped wedge prisms having different wedge angles.

Figure 5A:
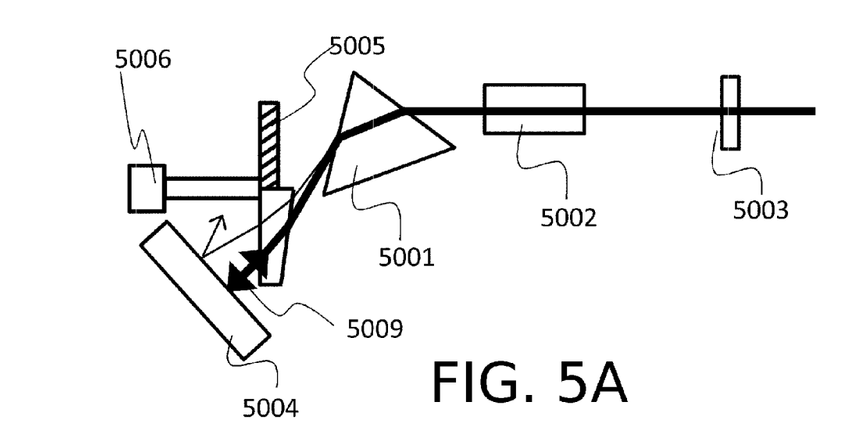
FIGS. 5A to 5D are schematic views illustrating a laser apparatus according to Embodiment 5.
Figure 5B:
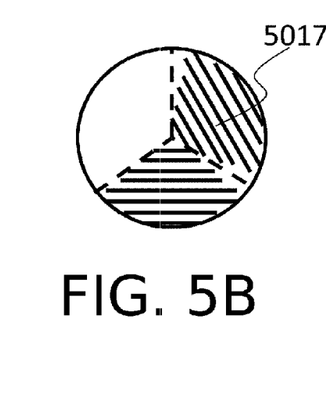

In FIG. 5B, the wheel-type wedge prism is formed of three sector-shaped wedge prisms 5017 having respective wedge angles θw of 0°, 0.08° and 0.16°, for example. The vertexes of these sector-shaped wedge prisms are positioned coincidentally with the center of the wheel-type wedge prism.

Figure 5C:
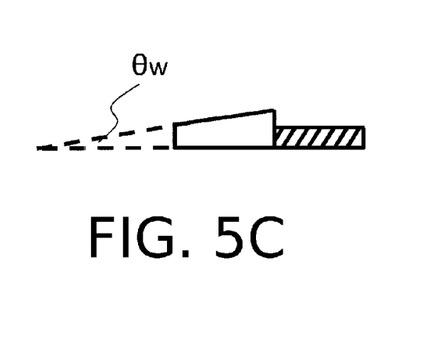

FIG. 5C illustrates a cross section of the wheel-type wedge prism shown in FIG. 5B. As shown in FIG. 5C, each sector-shaped wedge prism has wedge angle θw in a radial direction of the wheel-type wedge prism.

As shown in FIG. 5A, the wheel-type wedge prism 5005, which is fitted on a rotating mechanism 5006, rotates to insert the sector-shaped wedge prisms having different wedge angles into the optical path. The sector-shaped wedge prisms can be moved by the rotating mechanism circumferentially about the center defined by the vertexes thereof. As the sector-shaped wedge prisms move, the wedge prisms refract a light beam at different angles. Since the light beam is refracted at different refraction angles, light beams 5009 of different wavelengths are returned into the cavity by a mirror 5004 and generate oscillation.

Figure 5D:
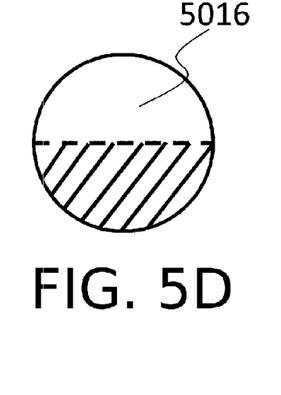

The wheel-type wedge prism according to the present embodiment may be formed of two semicircular wedge prisms 5016 having different wedge angles as shown in FIG. 5D. In the present embodiment using the wheel-type wedge prism, even when an error occurs in the rotating angle of the wheel-type wedge prism, no effect is brought about on the wedge angle θw of the wedge prism inserted. Therefore, a laser apparatus with less deviation of oscillation wavelength can be realized.

A prism 5001 as the wavelength dispersion mechanism, a gain member 5002 and an output coupler 5003 can be similar in feature to the corresponding components of the foregoing embodiments.

Embodiments 1 to 5 have been described as being capable of oscillating light beams of different wavelengths by inserting the wedge prism. Strictly speaking, upon passage of a light beam through the wedge prism, the wavelength dispersion of refractive index (dn/dλ) of the glass material forming the wedge prism causes wavelength dispersion of the refraction angle (dθ/dλ). However, when a prism for example is used as the wavelength dispersion mechanism, the wedge angle of the wedge prism is sufficiently smaller than the vertex angle of the prism and, hence, the wavelength dispersion of the refraction angle (dθ/dλ) by the wedge prism can be neglected. Therefore, the wedge prism inserted into the optical path does not substantially disturb the wavelength dispersion of the refraction angle (dθ/dλ) by the wavelength dispersion mechanism. For this reason, the wedge prism inserted into the optical path enables selective oscillation of light beams of desired wavelengths to be realized while suppressing the oscillation wavelength deviation due to the inclination error thereof.

Each of the foregoing embodiments uses the prism inserted into the optical path at the Brewster's angle as the wavelength dispersion mechanism. However, the configuration according to the present invention is not limited to the wavelength dispersion mechanism formed of such a prism.

Figure 6:
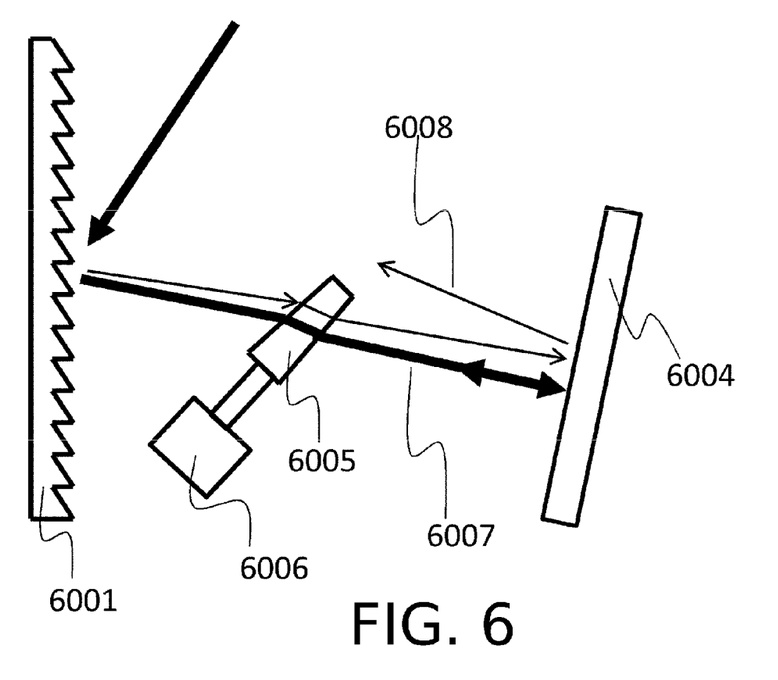
FIG. 6 is a schematic view illustrating a laser apparatus using a grating mirror.

FIG. 6 illustrates an exemplary wavelength dispersion mechanism formed of a grating mirror 6001. A reflection angle of light reflected by the grating mirror differs in accordance with the wavelength of light. Therefore, light beams 6007 and 6008 of different wavelengths can be respectively oscillated by inserting a wedge prism 6005 between the grating mirror 6001 and a mirror 6004 and by removing the wedge prism 6005 therefrom. An actuating mechanism 6006 can be similar in feature to the corresponding component of the foregoing embodiments.

In the foregoing embodiments, the methods of selecting oscillation wavelengths by using one wedge prism have been described. The laser apparatus according to the present invention may include two or more wedge prisms and actuating mechanisms which move those wedge prisms. The provision of a plurality of different wedge prisms enables selective oscillation of light beams of three or more different wavelengths.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-117745, filed on May 23, 2012, which is hereby incorporated by reference herein in its entirety.

What is claimed is:

1. A laser apparatus comprising:
a cavity provided with reflecting means and output means;
a gain member placed on an optical path between said reflecting means and said output means;
a wavelength dispersion mechanism configured to disperse a light beam passing through said optical path in accordance with a wavelength thereof; and
a wavelength selecting mechanism including a wedge prism which is movable relative to said optical path and changes a traveling direction of a light beam, said wavelength selecting mechanism being configured to change a wavelength of a light beam to be outputted from said output means by being given a gain by said gain member in accordance with a position of said wedge prism,
said wavelength dispersion mechanism including a prism which is positioned on said optical path to allow the light beam traveling on said optical path to become incident on said prism at Brewster's angle,
wherein said wedge prism has a wedge angle θw which satisfies the relationship:

$$\sin(\delta\theta+\theta w)=n\times\sin(\theta w),$$

where δθ represents an angle of separation between a wavelength λ1 and a wavelength λ2 by said wavelength dispersion mechanism, and n represents a refractive index of said wedge prism, the wavelength λ1 being a spectral center wavelength of a light beam outputted when said wedge prism is in a position out of said optical path, the wavelength λ2 being a spectral center wavelength of a light beam outputted when said wedge prism is in a position on said optical path, and
said wedge prism is movable to said position on said optical path in such a manner that said wedge prism is perpendicular to said optical path,
wherein the wavelength λ1 and the wavelength λ2 are two different wavelengths selected from a range from 700 nm to 800 nm, and
said wedge angle θw of said wedge prism satisfies the relationship:

$$0°<\theta w=<2.88°.$$

2. The laser apparatus according to claim 1, wherein said wedge prism has one side that is formed of part of a cylinder.

3. The laser apparatus according to claim 2, wherein a wedge angle distribution Δθw in a cross-section of the light beam satisfies the relationship:

$$\Delta\theta w/(d\theta/d\lambda)<=5 \text{ nm},$$

where $d\theta/d\lambda$ represents wavelength dispersion of a refraction angle by said wavelength dispersion mechanism.

4. The laser apparatus according to claim 2, wherein said cylinder forming one side of the wedge prism has a radius R which satisfies the relationship:

$$[180°/\pi \times d/R]/(d\theta/d\lambda) <= 5 \text{ nm},$$

where d represents a length of an arc forming a surface of said cylinder through which the light beam passes, and $d\theta/d\lambda$ represents wavelength dispersion of a refraction angle by said wavelength dispersion mechanism.

5. The laser apparatus according to claim 1, wherein
said wedge prism is a wheel-type wedge prism including a plurality of sector-shaped wedge prisms,
said sector-shaped wedge prisms each have a wedge angle in a radial direction of said wheel-type wedge prism, and
said wavelength selecting mechanism rotates said wheel-type wedge prism to select one of said sector-shaped wedge prisms through which a light beam passes.

6. The laser apparatus according to claim 1, wherein
said wavelength dispersion mechanism is a prism, and
the light beam becomes incident on said prism at substantially Brewster's angle.

7. The laser apparatus according to claim 6, wherein said wavelength dispersion mechanism includes two or more prisms which are positioned on said optical path at Brewster's angle relative to each other.

8. The laser apparatus according to claim 1, wherein said wavelength dispersion mechanism is a grating mirror.

9. A laser apparatus comprising:
a cavity provided with reflecting means and output means;
a gain member placed on an optical path between said reflecting means and said output means;
a wavelength dispersion mechanism configured to disperse a light beam passing through said optical path in accordance with a wavelength thereof; and
a wavelength selecting mechanism including a wedge prism which is movable relative to said optical path and changes a traveling direction of a light beam, said wavelength selecting mechanism being configured to change a wavelength of a light beam to be outputted from said output means by being given a gain by said gain member in accordance with a position of said wedge prism,
said wavelength dispersion mechanism including a prism which is positioned on said optical path to allow the light beam traveling on said optical path to become incident on said prism at Brewster's angle,
wherein said wedge prism has a wedge angle $\theta w$ which satisfies the relationship:

$$\sin(\delta\theta + \theta w + \theta b) = n \times \sin(\arcsin(\sin(\theta b)/n) + \theta w),$$

where $\delta\theta$ represents an angle of separation between a wavelength $\lambda 1$ and a wavelength $\lambda 2$ by said wavelength dispersion mechanism, n represents a refractive index of said wedge prism, and $\theta b$ represents Brewster's angle of said wedge prism, the wavelength $\lambda 1$ being a spectral center wavelength of a light beam outputted when said wedge prism is in a position out of said optical path, the wavelength $\lambda 2$ being a spectral center wavelength of a light beam outputted when said wedge prism is in a position on said optical path, and
said wedge prism is movable to the position on said optical path in such a manner that said wedge prism and said optical path form the angle $\theta b$ therebetween,
wherein the wavelength $\lambda 1$ and the wavelength $\lambda 2$ are two different wavelengths selected from a range from 700 nm to 800 nm, and
wherein the wedge angle $\theta w$ of said wedge prism satisfies the relationship:

$$0° < \theta w =< 1.20°.$$

* * * * *